(12) United States Patent
Cesaroni

(10) Patent No.: US 8,939,084 B2
(45) Date of Patent: Jan. 27, 2015

(54) SURFACE SKIMMING MUNITION

(76) Inventor: Anthony Joseph Cesaroni, Sarasota, FL (US)

( * ) Notice: Subject to any disclaimer, the term of this patent is extended or adjusted under 35 U.S.C. 154(b) by 96 days.

(21) Appl. No.: 13/416,296

(22) Filed: Mar. 9, 2012

(65) Prior Publication Data
US 2012/0234195 A1 Sep. 20, 2012

Related U.S. Application Data

(60) Provisional application No. 61/452,931, filed on Mar. 15, 2011.

(51) Int. Cl.
*F42B 15/22* (2006.01)
(52) U.S. Cl.
CPC ............... *F42B 15/22* (2013.01); *F24B 19/125* (2013.01)
USPC .............................. 102/399; 244/3.22; 114/23
(58) Field of Classification Search
CPC .......... F42B 10/64; F42B 10/14; F42B 10/60; F42B 10/663; F42B 10/30; F42B 19/00; B63B 2001/382; B63B 2001/00; B63B 1/07; B63G 8/08; B63G 8/14; B63G 8/18; B63G 8/20; B63G 3/02; B63G 3/04
USPC ............. 244/3.1, 3.21, 3.22, 3.24, 3.27, 3.29; 102/399; 114/20.1, 23, 20.2
See application file for complete search history.

(56) References Cited

U.S. PATENT DOCUMENTS

| | | | |
|---|---|---|---|
| 249,192 A | 11/1881 | Mallory | |
| 431,210 A | 7/1890 | Lassoe | |
| 1,410,872 A | 3/1922 | Baldwin | |
| 2,649,266 A | 8/1953 | Darrieus | |
| 3,060,854 A | 10/1962 | Maretti | |
| 4,113,204 A * | 9/1978 | Leek | 244/3.21 |
| 4,163,534 A * | 8/1979 | Seeger | 244/3.22 |
| 4,341,173 A * | 7/1982 | Hagelberg et al. | 114/20.2 |
| 4,384,690 A * | 5/1983 | Brodersen | 244/3.22 |
| 4,913,379 A * | 4/1990 | Kubota et al. | 244/52 |
| 4,944,226 A * | 7/1990 | Wedertz et al. | 102/476 |
| 4,967,982 A * | 11/1990 | Bagley | 244/3.22 |

(Continued)

FOREIGN PATENT DOCUMENTS

| | | | |
|---|---|---|---|
| DE | 2154585 | 6/1973 | |
| DE | 3222378 A1 * | 12/1983 | F42B 13/32 |

(Continued)

OTHER PUBLICATIONS http://ntrs.nasa.gov/archive/nasa/casi.ntrs.nasa.gov/19760010106_1976010106.pdf.

*Primary Examiner* — Benjamin P Lee
(74) *Attorney, Agent, or Firm* — Ohlandt, Greeley, Ruggiero & Perle, L.L.P.

(57) ABSTRACT

A surface skimming munition comprises a hull, a traction propulsion motor positioned in the hull and having a combustion chamber for combustion of a propellant, at least one aft directed nozzle coupled to the hull at a position forward of a center of gravity of the hull and comprising an inlet section and an outlet section, the inlet section in fluid communication with the combustion chamber and the outlet section directing combustion gas received from the combustion chamber through the inlet section in the aft direction, and at least one stabilizing plane coupled to the hull and moveable between a stowed position and a deployed position.

12 Claims, 18 Drawing Sheets

(56) References Cited

U.S. PATENT DOCUMENTS

| | | | |
|---|---|---|---|
| 5,186,117 A * | 2/1993 | Stallard, III | 114/330 |
| 5,238,204 A * | 8/1993 | Metz | 244/3.15 |
| 5,456,425 A * | 10/1995 | Morris et al. | 244/3.22 |
| 5,574,246 A | 11/1996 | Meyers et al. | |
| 6,073,880 A * | 6/2000 | Voigt et al. | 244/3.28 |
| 6,427,618 B1 * | 8/2002 | Hilleman | 114/338 |
| 6,647,888 B1 | 11/2003 | Cesaroni et al. | |
| 6,701,862 B2 | 3/2004 | Hilleman | |
| 6,725,797 B2 | 4/2004 | Hilleman | |
| 6,736,685 B2 | 5/2004 | Gieseke | |
| 6,886,774 B2 * | 5/2005 | Lamorlette | 244/3.15 |
| 7,022,196 B2 | 4/2006 | Cesaroni et al. | |
| 7,185,846 B1 * | 3/2007 | Bittle et al. | 244/3.28 |
| 7,226,016 B2 * | 6/2007 | Johnsson et al. | 244/3.28 |
| 7,325,769 B1 * | 2/2008 | Harnisch et al. | 244/3.28 |
| 7,337,743 B2 * | 3/2008 | Sydnor et al. | 114/271 |
| 7,598,451 B2 | 10/2009 | Minehart, III | |
| 7,690,309 B1 | 4/2010 | Kuklinski | |
| 7,891,298 B2 * | 2/2011 | Minick et al. | 102/501 |
| 8,319,164 B2 * | 11/2012 | Martinez | 244/3.27 |
| 8,674,278 B2 * | 3/2014 | Buckland et al. | 244/3.27 |
| 2002/0152947 A1 * | 10/2002 | Hilleman | 114/338 |
| 2002/0157589 A1 * | 10/2002 | Meyman | 114/20.2 |
| 2004/0232278 A1 * | 11/2004 | Geswender et al. | 244/3.28 |
| 2005/0284128 A1 | 12/2005 | Anderson et al. | |
| 2010/0314489 A1 * | 12/2010 | Buckland et al. | 244/3.27 |
| 2014/0061364 A1 * | 3/2014 | Strassman et al. | 244/3.22 |

FOREIGN PATENT DOCUMENTS

| | | | | |
|---|---|---|---|---|
| JP | 03220097 A * | 9/1991 | | B64G 1/00 |
| JP | 2008018899 | 1/2008 | | |

* cited by examiner

SURFACE SKIMMING MUNITION

CROSS-REFERENCED APPLICATION

This application claims priority to U.S. Provisional Patent Application No. 61/452,931, filed on Mar. 15, 2011, which is incorporated herein by reference in its entirety.

FIELD OF THE DISCLOSURE

The present disclosure relates generally to a munition and in particular to a surface skimming munition.

BACKGROUND OF THE DISCLOSURE

Munitions such as rockets and vessels are often deployed into bodies of water for travel to a specific target. Surface skimming rockets and vessels powered by either reciprocating engines or electric motors driving a propeller can achieve speeds well in excess of 100 knots. This is an efficient drive configuration provided that the water or sea states are relatively calm. In conditions such as Sea State 4, the hull will generally be cresting waves in the 1 meter range. The propellers or water jets can be airborne between the crest cycles resulting in considerable loss of propulsion efficiency. Pitch stability may also be considered as the propeller and hull engages and disengages the surface during these cycles.

High angles of attack occurring during planing transients can subject the hull to significant aerodynamic forces and lift. In many cases, these forces can overwhelm the aerodynamic authority and response time of the countering control surfaces. In addition, the angle of attack relative to the munitions forward motion may be so high that these surfaces aerodynamically stall and loose effectiveness completely causing the munition to flip over.

Various munition and munition propellant and control devices have been provided such as those described in U.S. Pat. No. 6,725,797 to Hilleman, U.S. Pat. No. 7,690,309 to Kuklinski, U.S. Pat. No. 6,427,618 to Hilleman, and U.S. Pat. No. 6,701,862 to Hilleman.

It is therefore an object of the present disclosure to at least provide a novel surface skimming munition device.

SUMMARY

Accordingly, in one aspect, there is provided a surface skimming munition comprising a hull, a traction propulsion motor positioned in the hull and having a combustion chamber for combustion of a propellant, at least one aft directed nozzle coupled to the hull at a position forward of a center of gravity of the hull and comprising an inlet section and an outlet section, the inlet section in fluid communication with the combustion chamber and the outlet section directing combustion gas received from the combustion chamber through the inlet section in the aft direction, and at least one stabilizing plane coupled to the hull and moveable between a stowed position and a deployed position.

According to another aspect, there is provided a surface skimming munition comprising a hull, a traction propulsion motor positioned in the hull and having a combustion chamber for combustion of a propellant, at least one aft directed nozzle coupled to the hull at a position forward of a center of gravity of the hull and comprising an inlet section and an outlet section, the inlet section in fluid communication with the combustion chamber and the outlet section directing combustion gas received from the combustion chamber through the inlet section in the aft direction, and a thrust vector control system coupled to the hull.

According to another aspect, there is provided a surface skimming munition comprising a hull, a traction propulsion motor positioned in the hull and having a combustion chamber for combustion of a propellant, and at least one stabilizing plane coupled to the hull and moveable between a stowed position and a deployed position.

The surface skimming munition further comprising an active or passive feature located on the bow that initiates the formation of a cavitation bubble which allows the surface skimming munition to accelerate through to a supercaptivated state when submerged or penetrating waves.

The surface skimming munition further comprising guidance and navigation control system which communicates with a launch operator as well as other surface skimming missiles during the attack in order to refine targeting accuracy and individual target selection within a group of potential targets.

BRIEF DESCRIPTION OF THE DRAWINGS

Embodiments will now be described more fully with reference to the accompanying drawings in which.

DETAILED DESCRIPTION OF THE PREFERRED EMBODIMENTS

Figure 1:
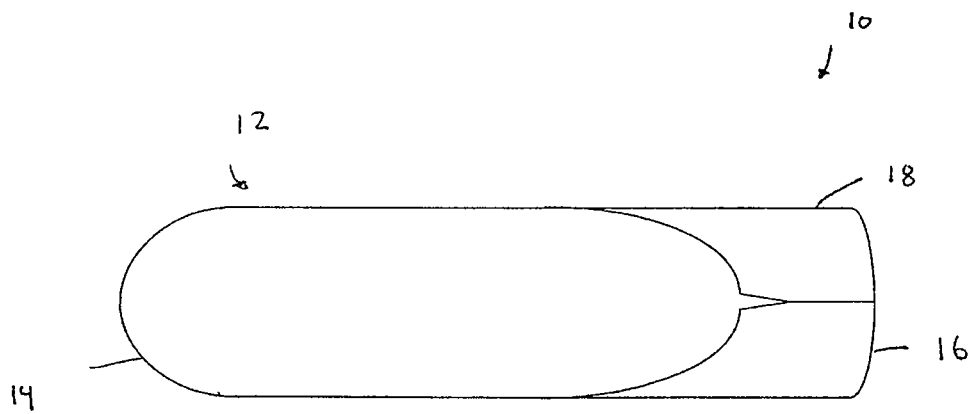
FIG. 1 is a top plan view of a surface skimming munition.
Figure 2:
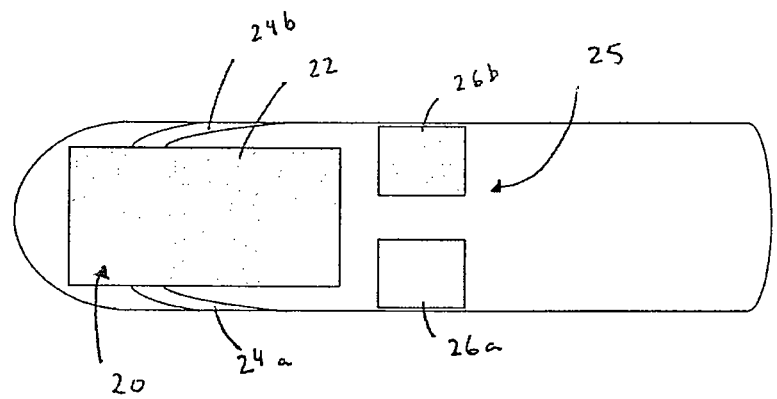
FIG. 2 is a schematic view of the surface skimming munition of FIG. 1.

Turning now to FIGS. 1 and 2, a surface skimming munition is shown and is generally identified by reference numeral 10. As can be seen, the munition 10 comprises a hull 12 having bow 14 and stern 16 portions. Stabilizing planes 18 are coupled to the hull 12 and are moveable between stowed and deployed positions, the details of which will be discussed below. A traction propulsion motor 20 is positioned within the hull 12. The traction propulsion motor 20 comprises an internal combustion chamber 22 extending longitudinally within the hull 12. The internal combustion chamber 22 is configured to receive a propellant therein (not shown) and supply combustion gas upon ignition of the propellant. The internal combustion chamber 22 is in fluid communication with a pair of aft directed exhaust nozzles 24a and 24b. The pair of aft directed exhaust nozzles 24a and 24b are sculpted on the surface of the munition 10 at a position forward of the center of gravity of the munition 10. A thrust vector control system 25 is coupled to the hull, which in this embodiment comprises a pair of thrust vector control vanes 26a and 26b that are coupled to the hull at a point approximately midpoint the hull 12 and are moveable between stowed and deployed positions. The pair of aft directed exhaust nozzles 24a and 24b are configured to direct combustion gas towards the pair of thrust vector control vanes 26a and 26b when the thrust vector control vanes 26a and 26b are in the deployed position.

In this embodiment, the munition 10 is dimensioned to fit inside an A-Size sonobuoy footprint, which as one skilled in the art will appreciate, has a length of 36" and a diameter of 4.5". The munition 10 is cylindrical in shape when the stabilizing planes 18 and thrust vector control vanes 26a and 26b are in the stowed position, and morphs into a suitably stable aerodynamic and hydrodynamic hull form when the stabilizing planes 18 and thrust vector control vanes 26a and 26b are extended into the deployed position, in the event that the munition is launched.

Figure 3A:
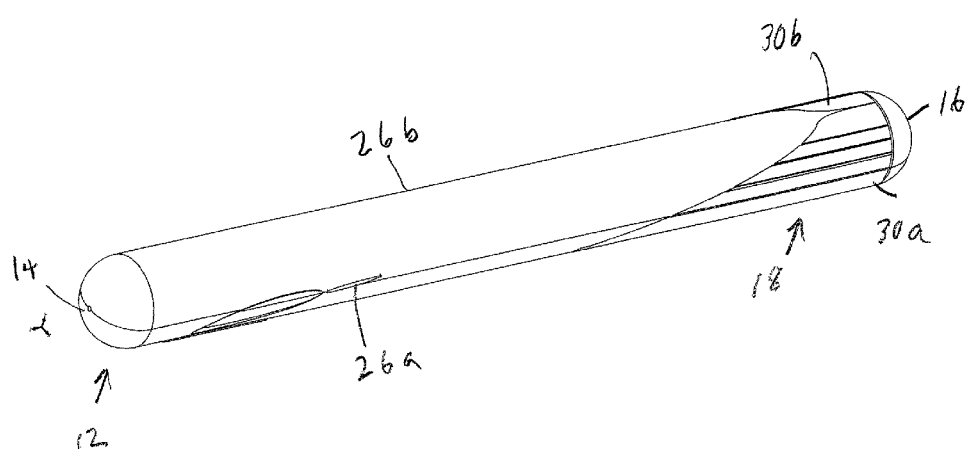
FIGS. 3a and 3b are isometric views of the surface skimming munition of FIG. 1 with the stabilizing planes and thrust vector control vanes in the stowed and deployed positions.

Turning now to FIG. 3a, an exemplary configuration for the stabilizing planes 18 and thrust vector control vanes 26a and 26b in the stowed position is shown. In this embodiment, stabilizing planes 18 comprise a pair of symmetrical planes 30a and 30b stored in a wrap-around configuration at the stern portion 16 of the hull 12. The thrust vector control vanes 24a and 24b are retracted within the hull 12.

Figure 3B:
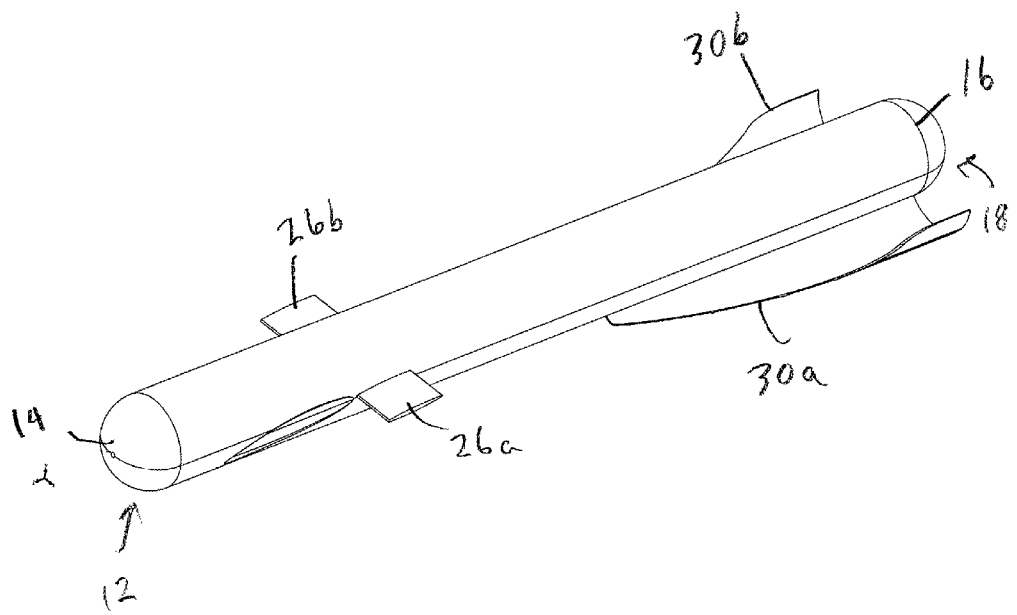

FIG. 3b illustrates the stabilizing planes 18 and thrust vector control vanes 26a and 26b when in the deployed position. As can be seen, the pair of symmetrical planes 30a and 30b are unfurled from their wrap-around configuration, but remain coupled along their bottom length to the hull 12. When in the deployed position, the pair of symmetrical planes 30a and 30b are U-shaped, providing aerodynamic and hydrodynamic stability to the munition 10 in the event the munition 10 is launched. Each of the thrust vector control vanes 26a and 26b extends radially from the surface of the hull 12. As can be seen, thrust vector control vanes 26a and 26b extend opposite in direction from one another. In this embodiment, the pair of symmetrical planes 30a and 30b and the thrust vector control vanes 26a and 26b are moveable between the stowed and deployed positions through use of an electric control circuit (not shown).

Figure 4:
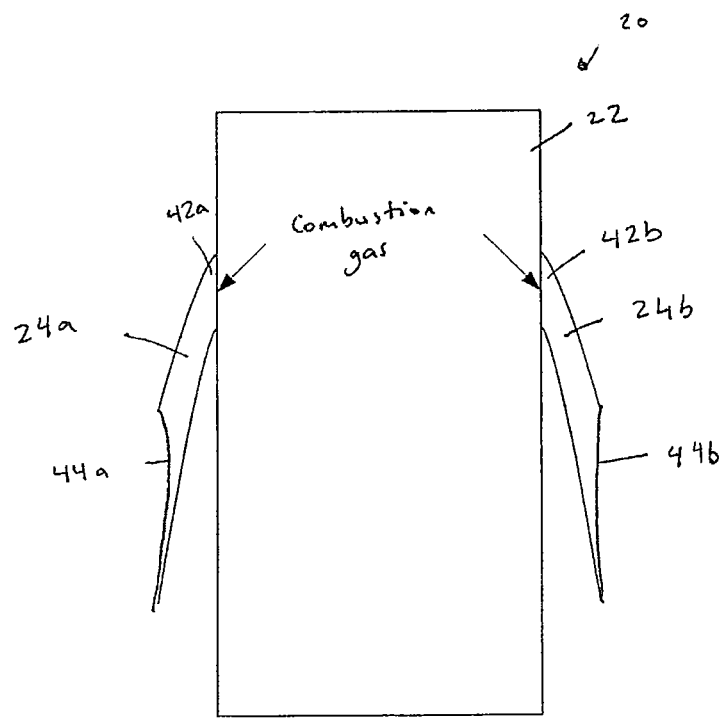
FIG. 4 is a schematic view of a traction control motor forming part of the munition of FIG. 1.

In this embodiment, the traction propulsion motor 20 is in the form of a solid rocket motor (SRM). As shown in FIG. 4, propulsion motor 20 contains an internal combustion chamber 22. The combustion chamber 22 is configured to receive a propellant therein (not shown) and supply combustion gas upon ignition of the propellant. The propellant may be any suitable oxidizing material such as, for example, hydrazinium nitroformate, ammonium dinitramide, etc. As mentioned previous, the combustion chamber 20 is in fluid communication with a pair of aft directed exhaust nozzles 24a and 24b. The pair of aft directed exhaust nozzles 24a and 24b are positioned forward of the center of gravity of the hull 10. The pair of aft directed exhaust nozzles 24a and 24b are configured to receive combustion gas from the internal combustion chamber 22 through inlet sections 42a and 42b and to direct the combustion gas out of the exhaust nozzles 24a and 24b through outlet sections 44a and 44b, towards the pair of thrust vector control vanes 26a and 26b when the thrust vector control vanes 26a and 26b are in the deployed position.

Figure 5:
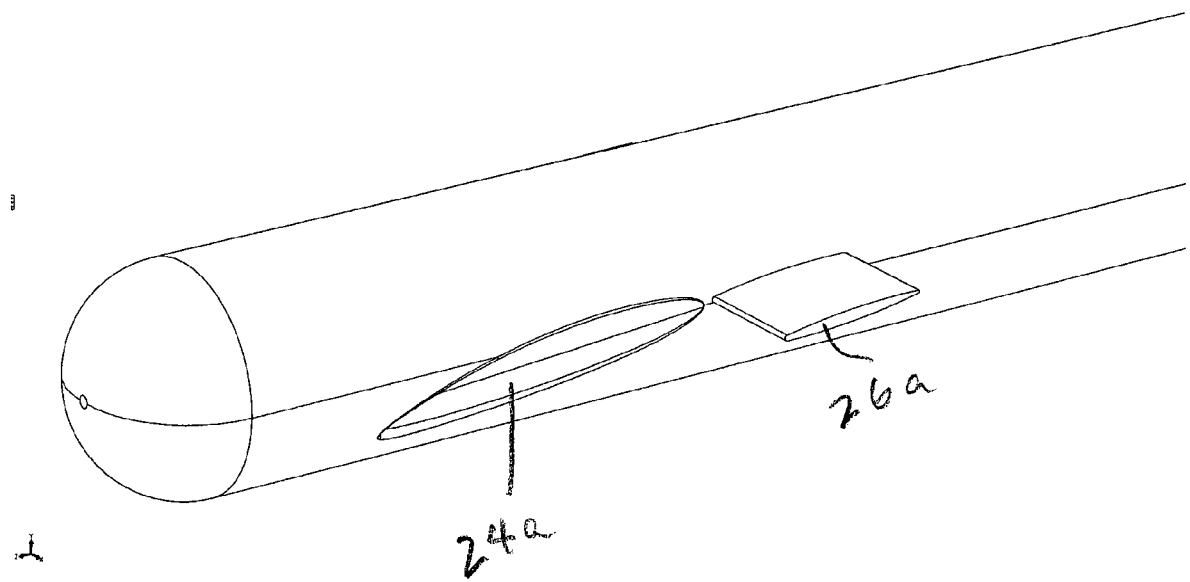
FIG. 5 is a side view of a nozzle and thrust vector control vane forming part of the munition of FIG. 1.

Turning now to FIG. 5, the combination of exhaust nozzle 24a and thrust vector control vane 26a is better shown. Combustion gas travels through the exhaust nozzle 24a and is directed to pass through the thrust vector control vane 26a. In response, the thrust vector control vane 26a directs the flow of combustion gas out of the nozzle 24a providing thrust vector control in the yaw, pitch and roll axis. As will be appreciated, exhaust nozzle 24b and thrust vector control vane 26b have an identical configuration to that of exhaust nozzle 24a and thrust vector control vane 26a. In this embodiment, the thrust vector control vanes 26a and 26b are made of a material that can withstand high temperatures such as for example graphic, metal alloys, ceramics, and high temperature composites.

Figure 6A:
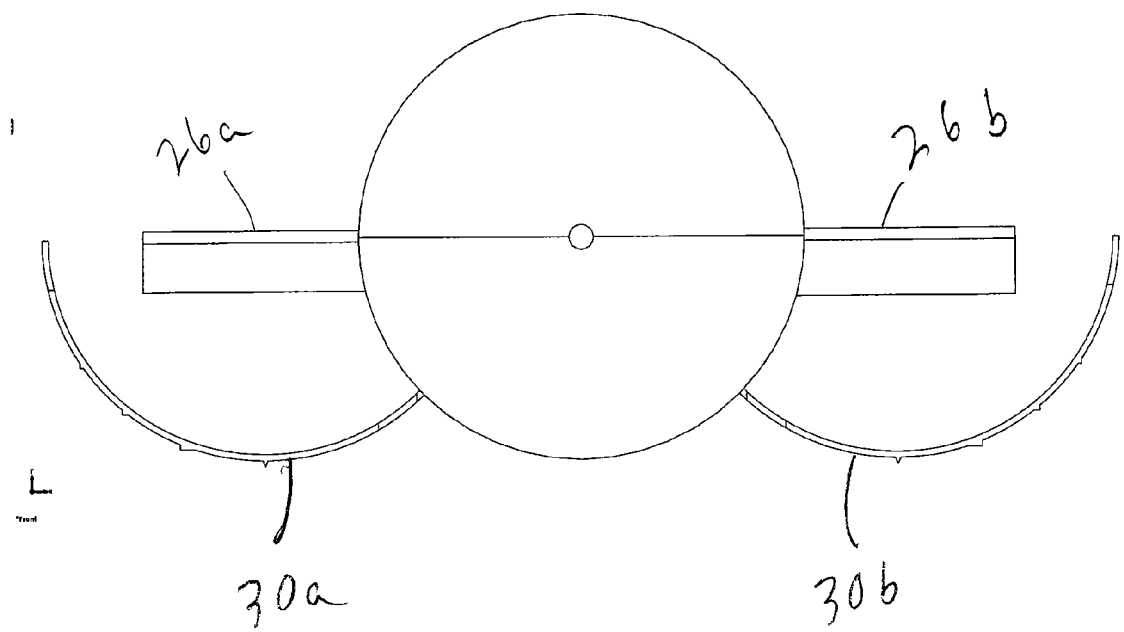
FIGS. 6a and 6b are rear views of the munition of FIG. 1 showing the thrust vector control vanes in operation.
Figure 6B:
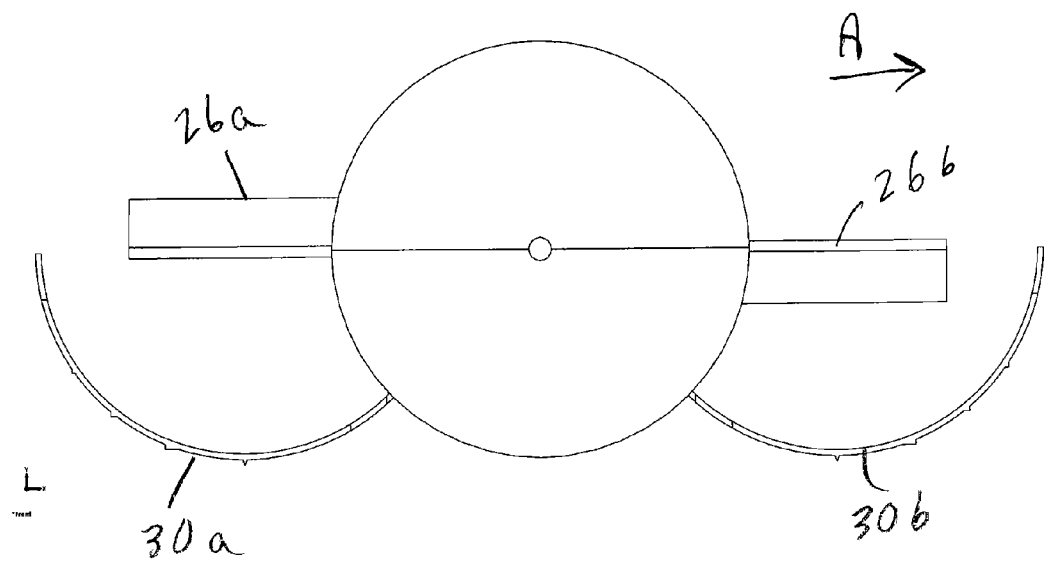
Figure 7:
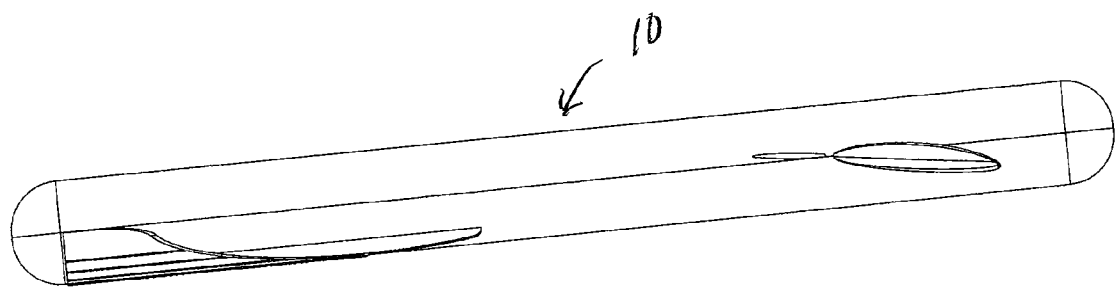
FIG. 7 is a side view showing a launch angle of the munition of FIG. 1.

FIGS. 6a and 6b illustrate an exemplary vector control movement made by thrust vector control vanes 26a and 26b of the thrust vector control system 25. As can be seen, the thrust vector control vanes 26a and 26b as well as the symmetrical planes 30a and 30b are in the deployed position. As can be seen in FIG. 6a, thrust vector control vanes 26a and 26b are aligned with respect to one another, thereby providing equal control. As shown in FIG. 6b, thrust vector control vane 26a is adjusted (compared to the position shown in FIG. 6a) such that it is out of alignment and above thrust vector control vane 26b, thereby providing control to cause the munition to veer to the right as indicated by arrow A in FIG. 6b.

Those skilled in the art will appreciate that control may be provided to the munition 10 through use of any type of control and guidance systems such as for example autonomous, semi-autonomous, or remote control systems.

In operation, the munition 10 remains idle with the stabilizing planes 18 and thrust vector stabilizing planes 26a and 26b in the stowed position until the munition 10 is launched. When launched, munition 10 skims along the surface of the body of water in which it is launched at an angle of attack, such as that shown in FIG. 8. Upon launch, the stabilizing planes 18 and thrust vector stabilizing planes 26a and 26b are extended to the deployed position. The traction propulsion motor 18 ignites the propellant. Combustion gas produced by the burning of the propellant creates an increase in pressure within the internal combustion chamber 22. The combustion gas is directed out of the internal combustion chamber 22 via inlet sections 42a and 42b of the aft directed nozzles 24a and 24b and out of the aft directed nozzles 24a and 24b via outlet sections 44a and 44b, causing the munition 10 to travel at a high speeds in excess of 100 knots. The exhaust is directed in the aft direction towards the pair of thrust vector control vanes 26a and 26b. In response, the thrust vector control vanes 26a and 26b direct the combustion gas out of the aft directed exhaust nozzles 24a and 24b providing thrust vector control in the yaw, pitch and roll axis. As the munition 10 skims the surface of the body of water in which it is launched, the positioning of the aft directed nozzles 24a and 24b enables the traction propulsion motor 18 to pull the munition 10 through the body of water. This allows the munition to remain stable along the vector of thrust. In the event the munition 10 must travel underneath the surface of the body of water, for example during rough sea conditions in which the munition 10 may have to pierce a wave, the combustion gas expelled by the aft directed nozzles 24a and 24b forms a cavitation bubble causing the munition 10 to accelerate through to a supercavitated state. This enables the munition 10 to travel without a minimal amount of drag compared to that of which a typical underwater traveling object would encounter. It will be appreciated that the munition 10 may be launched from shore, sea or air platforms.

Figure 8:
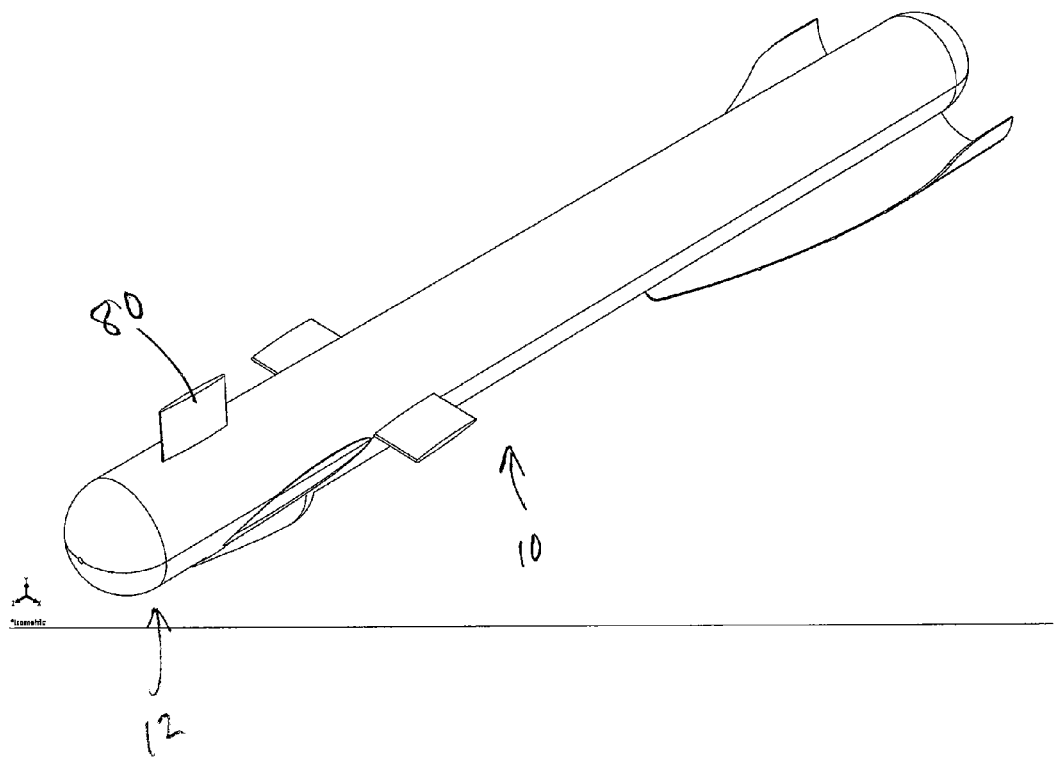
FIG. 8 is a perspective view showing a further embodiment of a surface skimming munition.

Turning now to FIG. 8, another embodiment of the munition 10 is shown. As can be seen, munition 10 is similar to that of the munition described above with reference to FIGS. 1 to 7, however the stabilizing planes 18 further comprise a yaw stabilizing plane 80. The yaw stabilizing plane 80 is moveable between a stored and deployed position, the deployed position being shown in FIG. 9. In the deployed position, yaw stabilizing plane 80 extends radially from the hull 12 in an upwards direction relative to the orientation of the munition 10 when it is launched. Yaw stabilizing plane 80 provides additional control of the munition 10 with respect to the yaw axis.

Figure 9:
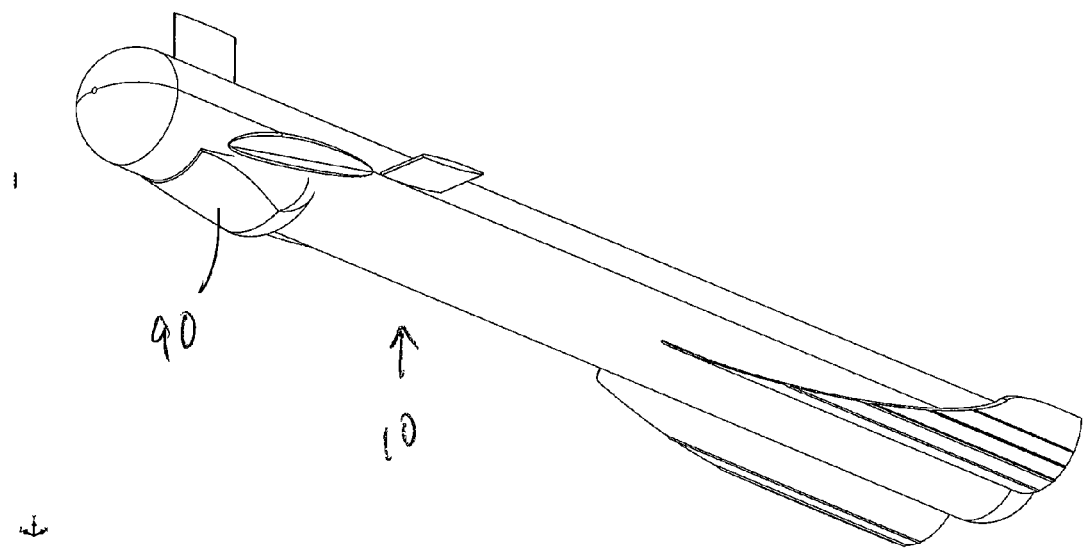
FIG. 9 is a perspective view showing a further embodiment of a surface skimming munition.

FIG. 9 shows another embodiment of the munition 10. As can be seen, munition 10 is similar to that of the munition described above with reference to FIGS. 1 to 7, however the stabilizing planes 18 further comprise an inflatable nose stabilizing plane 90. The nose stabilizing plane 90 is stored within the hull 12 in a stowed position. In the stowed position, the nose stabilizing plane 90 is deflated. The nose stabilizing plane 90 is inflatable from the stowed position to a deployed position by use of an air pump (not shown), the deployed position being shown in FIG. 9. In the deployed position, nose stabilizing plane 90 extends from the nose of hull 12, which is located on the bottom side of the munition 10 relative to the orientation of the munition 10 when it is launched. Nose stabilizing plane 90 assists in initial static vehicle attitude and transition to cruising angle of attack, if required. In this embodiment the nose stabilizing plane 90 is made of an inflatable aluminum alloy.

Figure 10:
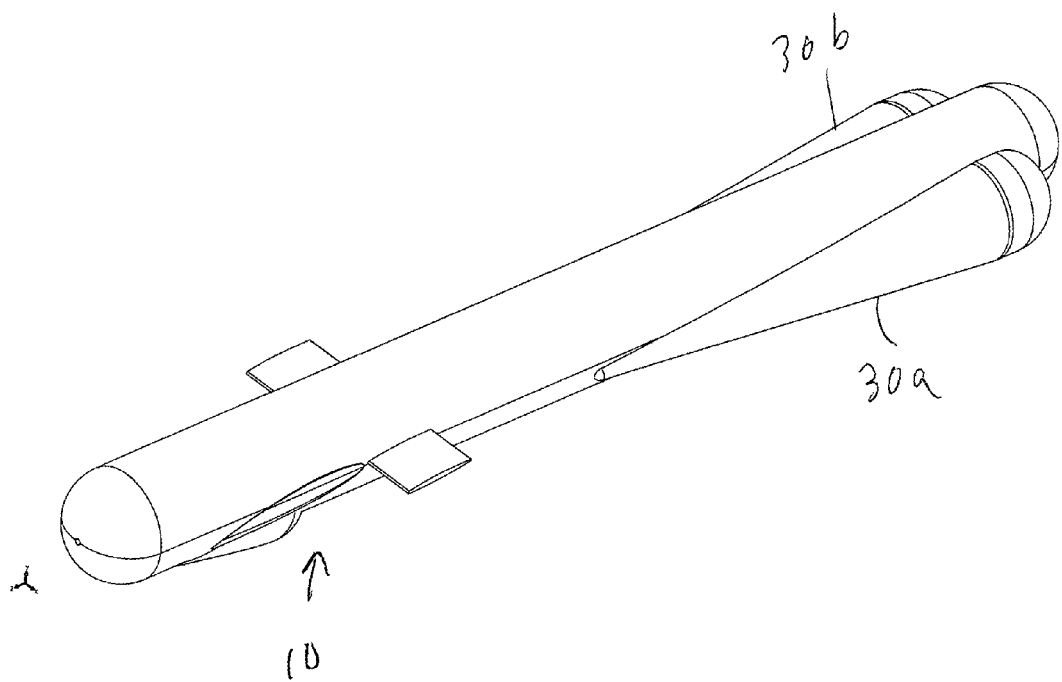
FIG. 10 is a perspective view showing a further embodiment of a surface skimming munition.

Turning now to FIG. 10, another embodiment of munition 10 is shown. As can be seen, munition 10 is similar to that of the munition described above with reference to FIGS. 1 to 7 however the symmetrical planes 30*a* and 30*b* are inflatable from the stowed position to the deployed position. In this embodiment, the symmetrical planes 30*a* and 30*b* are connected to and located within the hull 12 when in the stowed position (not shown). In the stowed position, the symmetrical planes 30*a* and 30*b* are deflated. The symmetrical planes 30*a* and 30*b* are inflatable from the stowed position to the deployed position by use of an air pump (not shown), the deployed position being shown in FIG. 10. Once deployed, the symmetrical planes 30*a* and 30*b* act in a similar manner to that described above.

Figure 11:
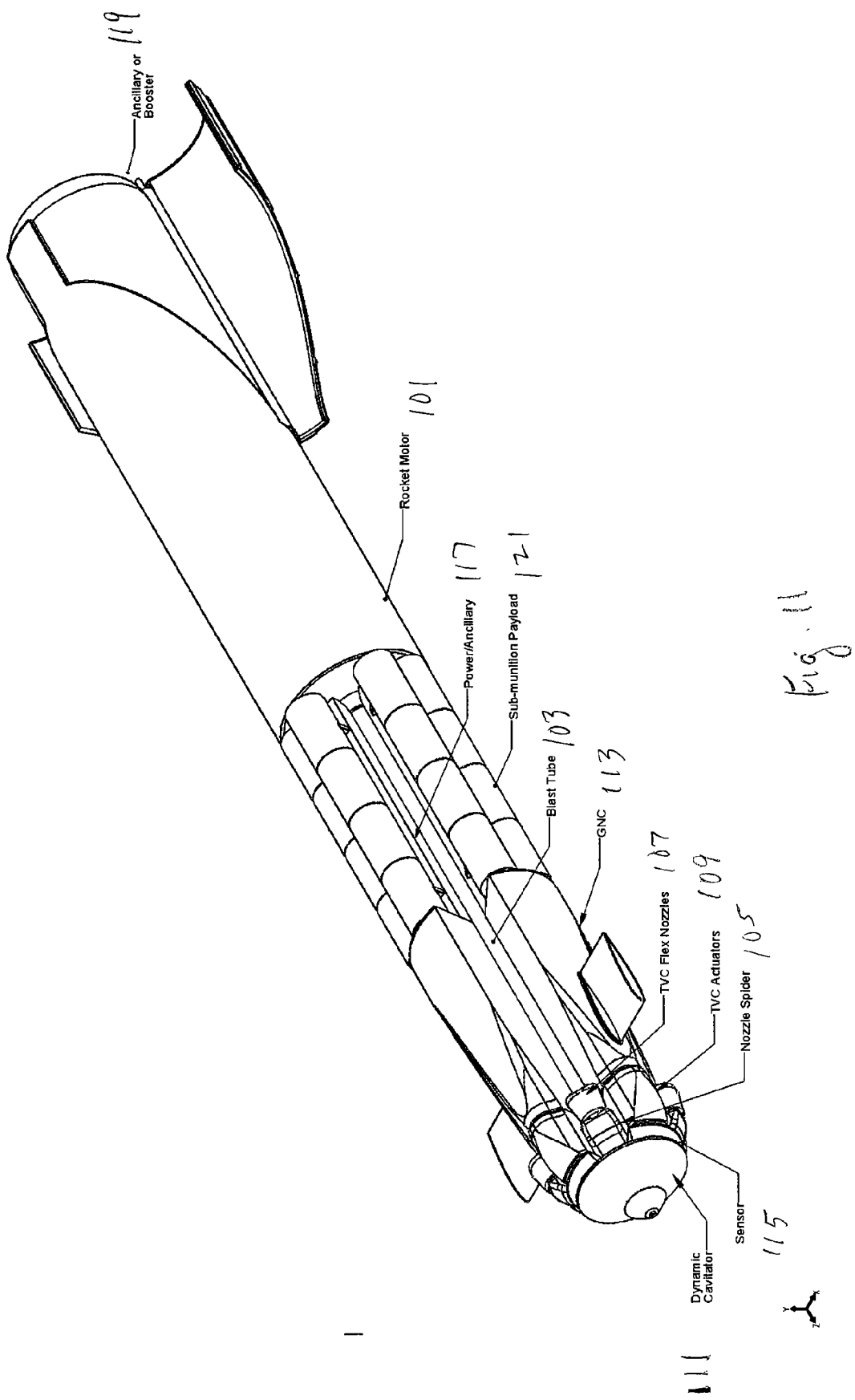
FIG. 11 is an interior view of the surface skimming munition of the present disclosure.

FIG. 11 is an interior view of the surface skimming munition of the present disclosure. FIG. 11 depicts the following components:

Rocket Motor 101 having a pressure vessel/combustion chamber containing propellant that when ignited generates hot, high pressure gas.

Blast Tube 103 having an insulated conduit that connects the rocket motor combustion chamber to the nozzle spider manifold 105 and carries the rocket motor combustion products during operation.

Nozzle Spider Manifold 105 having an insulated manifold that divides the gas flow from the blast tube to multiple nozzles as well as the dynamic cavitator.

Flex Nozzle 107 comprising a classic DeLaval rocket nozzle that accelerates the rocket motor gas to supersonic speed by converting heat to kinetic energy. In this example, 4 nozzles are shown and incorporate a flexible divergent section that can vector in 2 or more axis to provide thrust vector control. The nozzles provide thrust for the missile as well as roll, pitch and yaw control while augmenting the cavitation bubble initiated by the cavitator on the tip of the missile when the missile penetrates water.

TVC Actuator Module 109 having an electro-mechanical or hydraulic servo device used to actuate the flex nozzles for TVC.

Dynamic Cavitator 111 which utilizes gas bleed on demand from the nozzle spider manifold in order to initiate supercavitation upon entry into the water. By using this gas injection method, the dynamic cavitator can initiate a state of supercavitation over a wider range of velocities and conditions when compared to a passive cavitator design.

GNC 113 which is a guidance navigation and control module. GNC ancillary 113 example. Other locations can also be used.

Sensor 115.

Payload 121 Can be lethal or non-lethal or a scientific package etc. Sub-munitions or cluster munitions are shown in this example. Power/Ancillary 11, such as batteries or additional ancillaries, such as antennas, sensors etc.

Ancillary or booster 119 may include a small booster motor (not should) used to accelerate the missile at launch, or to augment thrust during end game maneuvers. Can also be an ancillary, such as an anchor release and/or flotation device.

Figure 12:
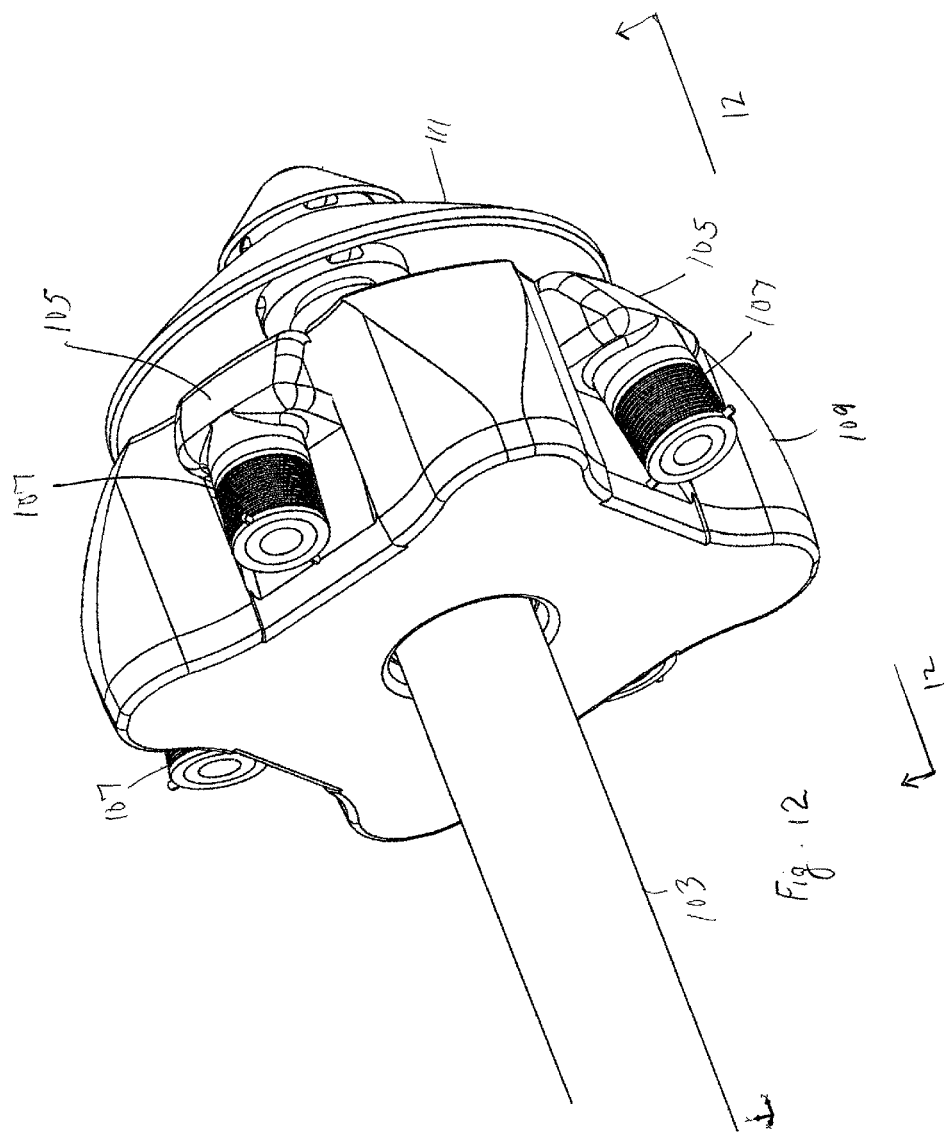
FIG. 12 is a right side bottom view of the nose portion of the surface skimming munition of FIG. 11.

FIG. 12 is a right side bottom view of the nose portion or power head of the surface skimming munition of FIG. 11, clearly showing the nozzle spiders 105 and TVC flex nozzles 107.

Figure 13:
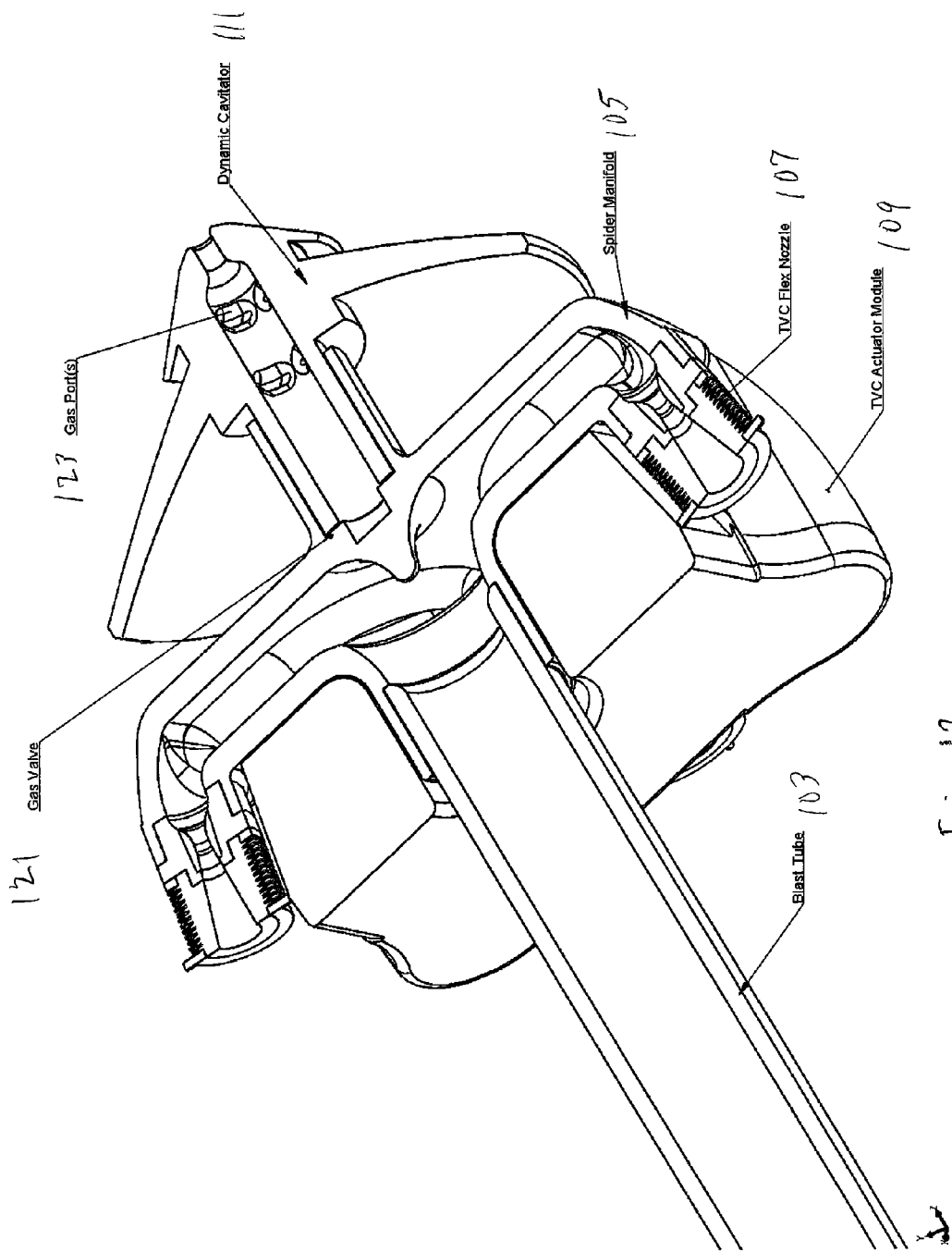
FIG. 13 is a cross-section view of the nose portion of FIG. 12 along line 12-12.

FIG. 13 is a cross-section view of the nose portion or power head of FIG. 12 along line 12-12, which depicts the gas valve 121 and gas ports being disposed between dynamic cavitator 111 and spider manifold 105, thereby allowing gas bubbles to pass from gas valve 121 into gas ports 123 and out through dynamic cavitator 111 according to another embodiment of this disclosure.

Figure 14:
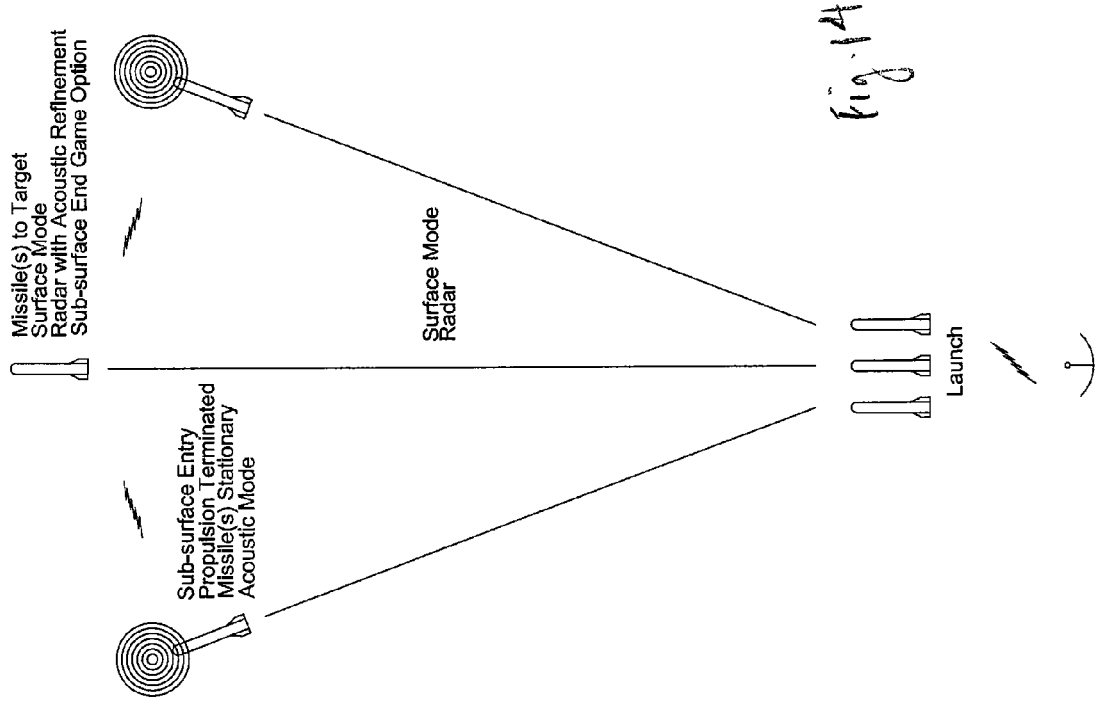
FIG. 14 is a schematic diagram of a plurality of surface skimming munition missiles to target surface mode radar with acoustic refinement sub-surface end game option.

FIG. 14 is a schematic diagram of a plurality of surface skimming munition missiles to target surface mode radar with acoustic refinement sub-surface end game option. In the example shown in FIG. 14, a potential target or target cluster would be acquired by radar as in the FIG. 15 below. The SSAMi(s) would then be launched and guided to the target area by radar. Rather than transitioning to sub-surface propulsion mode, thrust would be terminated on one or more of the missiles where they would enter the water and act a silent sonobuoy. Acoustic targeting information could then be relayed to other SSAMi missiles to refine the radar information and/or back to the launch point to target subsequent missile launches. This could also be augmented with traditional sonobuoys if required while providing surveillance in advance of any attack that may be required. It may also be possible to combine the methods in these two examples. Energy would be conserved for end game operation and more flexibility in a "swarming" scenario could be provided using this approach.

Figure 15:
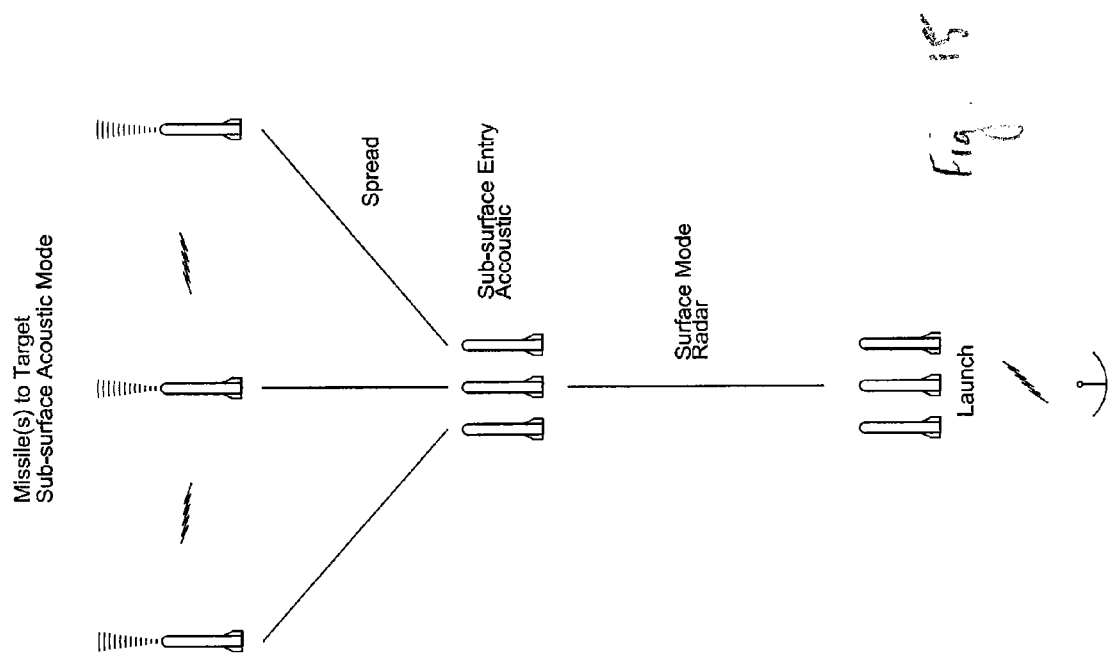
FIG. 15 is a schematic diagram of a plurality of surface skimming munition missiles to target sub-surface acoustic mode.

FIG. 15 is a schematic diagram of a plurality of surface skimming munition missiles to target sub-surface acoustic mode. Basic attitude and directional control could be provided using a multi-axis gyroscope system in combination with forward and side looking horizon sensors, altitude/proximity means and GPS as a control example. The following are notional targeting method examples. In this example shown in FIG. 15, a potential target or target cluster would be acquired by radar. Three or more SSAMi missiles would then be launched and guided within close proximity to the target in surface mode. At an appropriate distance, the missiles would then transition to sub-surface mode, perform a spread maneuver where guidance would be provided by narrow spectrum acoustic means. The missiles would have the ability to communicate with each other while refining targeting and end game maneuvers.

Figure 16:
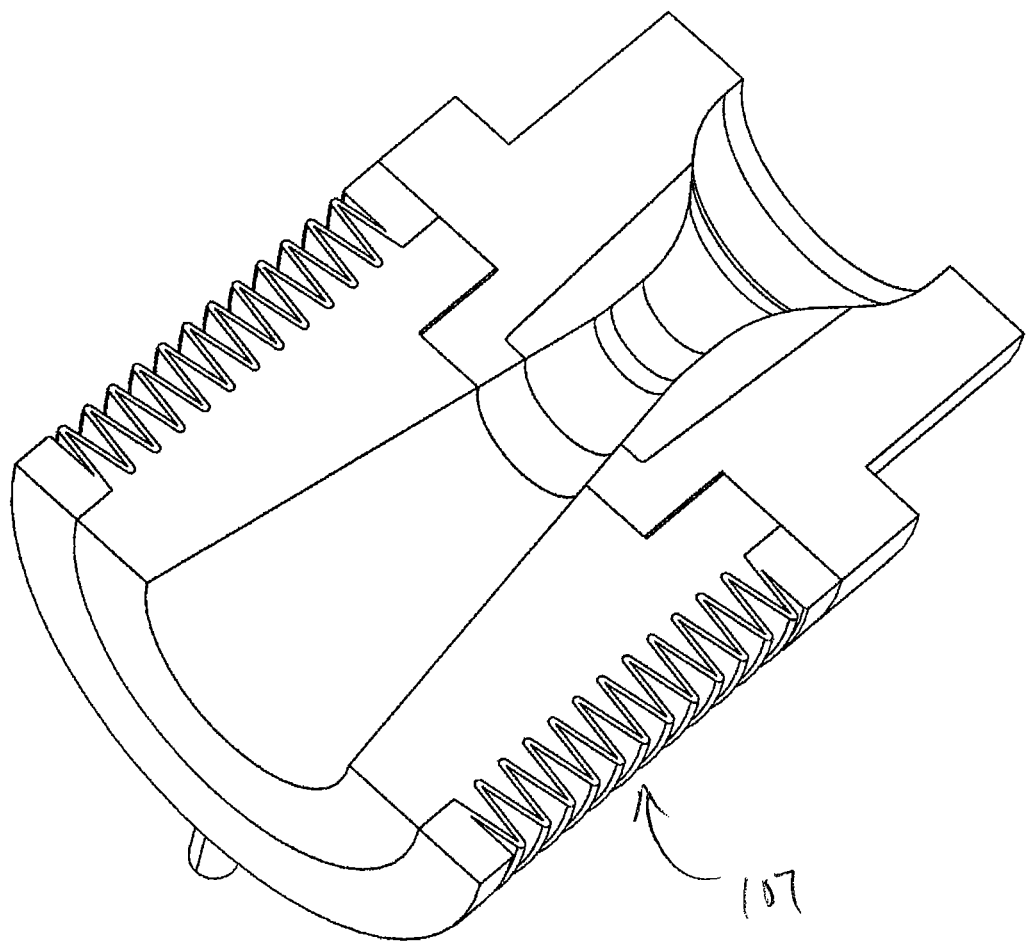
FIG. 16 is a cross-section view of a TVC flex nozzle.

FIG. 16 is a cross-section view of TVC flex nozzle 107.

Figure 17:
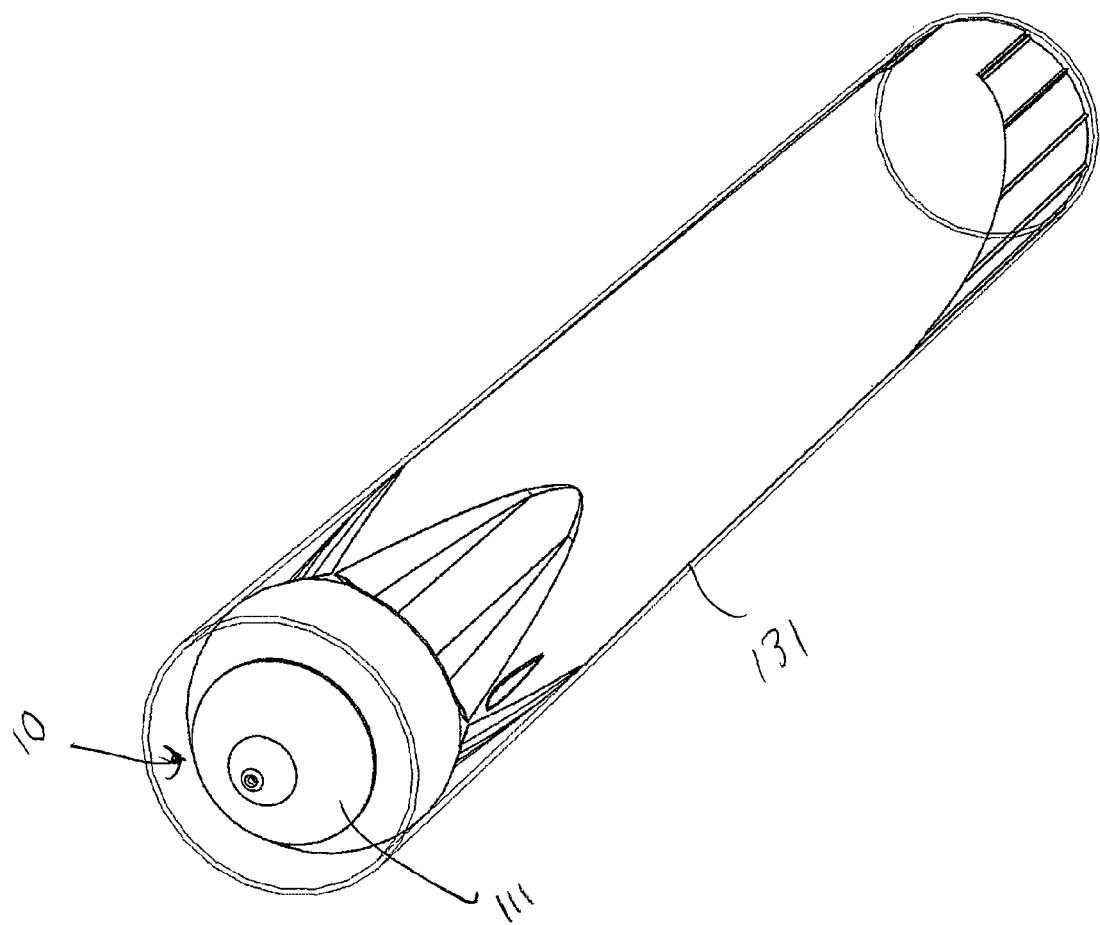
FIG. 17 is a front right-side perspective view of a sonobuoy launch tube or shoulder launcher wherein the surfaces are retracted prior to launch.

FIG. 17 is a front right-side perspective view of a sonobuoy launch tube or shoulder launcher 131 wherein the surfaces of munition or missile 10 are retracted prior to launch.

Although the thrust vector control system is described as comprising a pair of thrust vector control vanes, those skilled in the art will appreciate that an additional vertical aerodynamic control surface may be used if additional yaw authority is required. Further, differential nozzle thrust control may be used for additional yaw control.

Those skilled in the art will appreciate that the thrust vector control system used with the munition may be any type of thrust vector control system. For example, in an embodiment, the munition may comprise a single nozzle in the form of an annular nozzle oriented circumferentially about the hull, the annular nozzle providing thrust vector control to the munition. In another embodiment, differential nozzle thrust control may be used with the pair of aft directed nozzles providing thrust vector control to the munition. The thrust vector control system may be a gimbaled thrust system wherein the aft directed nozzles are swiveled from side to side to provide thrust vector control to the munition. The thrust vector control system may be a fluid injection thrust vector control system wherein the aft directed nozzles are fixed, but a relatively cool fluid is introduced into the combustion gas through use of an injection system.

Those skilled in the art will appreciate that other types of nozzle designs may be used such as for example a de Laval nozzle design.

Although the traction propulsion motor is described as being a solid rocket motor, those skilled in the art that any type of rocket motor may be used. For example, the motor may be a bi-propellant rocket motor, a gas generator (classical) hybrid rocket motor, or a solid state hybrid rocket motor may be used.

Although the thrust vector control system is described as utilizing a pair of thrust vector control vanes, those skilled in the art will appreciate that any number of thrust control vanes may be used, in any suitable configuration.

Although the thrust vector control vanes are described as being made of a high temperature material, those skilled in the art that they may be made of any combination of materials capable of withstanding high temperatures. For example, the thrust vector control vanes may be made of a metal material that is cooled by water (in which the munition is launched).

Although the stabilizing planes are described as being made of a rigid material or an inflatable material, those skilled in the art will appreciate that the stabilizing planes may be made of a combination of materials. For example, the stabilizing planes may be extended from the stowed to the deployed position as a planar surface, and may further comprise a plurality of inflatable members providing additional strength to the stabilizing planes that are inflatable once the stabilizing planes are extended to the deployed position.

Although the stabilizing planes are described as being inflatable by use of an air pump, those skilled in the art will appreciate that the stabilizing planes may be inflated using any type of fluid, such as for example a type of gas or liquid. In an embodiment, a miniature gas generator may be used. As will be further appreciated, the inflation level of the stabilizing planes may further be configured and adjusted using the fluid to optimize flotation and self righting characteristics.

Although the stabilizing planes are described as comprising a pair of symmetrical planes, a nose stabilizing plane, and a yaw stabilizing plane, each being moveable between the stowed to the deployed position, those skilled in the art that any type of stabilizing plane may be used to control the path of travel of the munition, in any suitable configuration.

Although the stabilizing planes are described as being moveable between the stowed and deployed positions through use of an electric control circuit or through inflation and deflation, those skilled in the art will appreciate that variants are available. For example, the stabilizing planes may each be coupled at a pivot point inside the hull, and may be moveable between the stowed and deployed positions through use of a rotatable shaft. The rotation of the shaft may be activated by a mechanical actuator, a rotary actuator, etc. When the shaft is rotated, the stabilizing planes will extend to the deployed position or retracted to the stowed position. Those skilled in the art will appreciate that the stabilizing planes may be moveable between the stowed and deployed positions using other mechanical, structural and hydraulic variants. The thrust vector control vanes may similarly be controlled.

Although embodiments were described in which the stabilizing planes are made of an inflatable aluminum material, those skilled in the art will appreciate that they may be made of other types of materials such as for example elastomers, polymers, etc.

Although the munition is described as comprising a pair of aft directed nozzles, those skilled in the art will appreciate that any number of aft directed nozzles may be used, in any suitable configuration. For example, the munition may comprise two pairs of aft directed nozzles, wherein one of the pair of nozzles is positioned adjacent to the other one of the pair of nozzles. Further, the nozzles may be directed to separate thrust vector control vanes.

Those skilled in the art will appreciate that the aft directed nozzles may be in fluid communication with the combustion chamber via a blast tube.

Those skilled in the art will appreciate that the munition may also be provided with initial directional aiming and sea keeping capability prior to launch. For example, a small electric water jet or propeller module may be jettisoned at the time of ignition to reduce mass and drag.

When introducing elements disclosed herein, the articles "a", "an", "the", and "said" are intended to mean that there are one or more of the elements. The terms "comprising", "having", "including" are intended to be open-ended and mean that there may be additional elements other than the listed elements.

Although embodiments of the munition have been shown and described above, those of skill in the art will appreciate that further variations and modifications may be made without departing from the spirit and scope thereof as defined by the appended claims.

What is claimed is:

1. A surface skimming munition comprising:
    a hull;
    a traction propulsion motor positioned in the hull and having a combustion chamber for combustion of a propellant;
    at least one aft directed nozzle coupled to the hull at a position forward of a center of gravity of the hull and comprising an inlet section and an outlet section, the inlet section in fluid communication with the combustion chamber and the outlet section directing combustion gas received from the combustion chamber through the inlet section in the aft direction; and a thrust vector control system coupled to the hull;
wherein the at least one aft directed nozzle is configured to form a cavitation bubble causing the surface skimming munition to accelerate through to a supercaptivated state when either submerged or penetrating a wave.

2. The surface skimming munition of claim 1, wherein the thrust vector control system comprises at least one thrust vector control vane coupled to the hull and moveable between a stowed position and a deployed position.

3. The surface skimming munition of claim 2, wherein the at least one thrust vector control vane extends radially from the hull.

4. The surface skimming munition of claim 3, wherein the at least one aft directed nozzle directs exhaust through the outlet section towards the at least one thrust vector control vane.

5. The surface skimming munition of claim 2, wherein the at least one thrust vector control vane is at least one pair of thrust vector control vanes.

6. The surface skimming munition of claim 1, wherein the at least one aft directed nozzle is at least a pair of aft directed nozzles.

7. The surface skimming munition of claim 1, wherein the at least one aft directed nozzle is a de Laval nozzle.

8. The surface skimming munition of claim 1, wherein the at least one aft directed nozzle is an annular nozzle.

9. The surface skimming munition of claim 6, wherein the thrust vector control system is configured to provide differential nozzle thrust control to the at least one pair of aft directed nozzles.

10. The surface skimming munition of claim 1, wherein the thrust vector control system comprises a vertical aerodynamic control surface for providing additional yaw authority.

11. The surface skimming munition of claim 1, wherein the at least one aft directed nozzle is pivotally coupled to the hull and the thrust vector control system is a gimballed thrust vector control system.

12. The surface skimming munition of claim 1, wherein the thrust vector control system is a fluid injection thrust vector control system comprising an injection system providing fluid to the at least one aft directed nozzle.

* * * * *